United States Patent
Haskell et al.

[11] Patent Number: 6,111,596
[45] Date of Patent: Aug. 29, 2000

[54] GAIN AND OFFSET CORRECTION FOR EFFICIENT STEREOSCOPIC CODING AND IMPROVED DISPLAY

[75] Inventors: Barin Geoffry Haskell, Tinton Falls; Richard Virgil Kollarits, Colts Neck, both of N.J.; Atul Puri, Riverdale, N.Y.

[73] Assignee: Lucent Technologies Inc., Murray Hill, N.J.

[21] Appl. No.: 08/732,822

[22] Filed: Oct. 15, 1996

Related U.S. Application Data

[60] Provisional application No. 60/009,315, Dec. 29, 1995.

[51] Int. Cl.[7] ................................................. H04N 13/00
[52] U.S. Cl. .............................. 348/42; 348/43; 348/47
[58] Field of Search .............................. 348/43, 42, 47, 348/51, 229, 54, 48, 44, 52, 409, 46; 356/12; 382/154, 152, 160, 168, 169; H04N 13/00

[56] References Cited

U.S. PATENT DOCUMENTS

| | | | |
|---|---|---|---|
| 5,065,236 | 11/1991 | Diner | 348/54 |
| 5,101,268 | 3/1992 | Ohba | 348/43 |
| 5,296,926 | 3/1994 | Nagura | 348/43 |
| 5,345,086 | 9/1994 | Bertram | 356/12 |
| 5,612,735 | 3/1997 | Haskell et al. | 348/43 |
| 5,619,256 | 4/1997 | Haskell et al. | 348/47 |
| 5,867,591 | 2/1999 | Onda | 348/43 |

OTHER PUBLICATIONS

A.Puri, "Video Coding Using the MPEG–2 Compression Standard," Proceedings of SPIE Visual Communications and Image Processing, vol. 2094 Boston, Mass., Nov. 1993, pp. 1701–1713.

L. Schmidt, A. Puri and B.G. Haskell, "Performance Evaluation of Nonscalable MPEG–2 Video Coding," Proceedings of SPIE Visual Communications and Image Processing, Chicago, Ill., Sep. 1994, pp. 296–310.

A. Puri, L. Yan and B.G. Haskell, "Temporal Resolution Scalable Visual Coding," Proceedings of IEEE International Conference on Image Processing, Austin, Texas, Nov. 1994, pp. 947–951.

A. Puri, R.V. Kollarits and B.G. Haskell, Stereoscopic Video Compression using Temporal Scalability, Proceedings of SPIE Visual Comunications and Image Processing, Taipei, Taiwan, May, 1995.

*Primary Examiner*—Vu Le
*Assistant Examiner*—Gims S. Philippe

[57] ABSTRACT

A method for increasing compression efficiency of a stereoscopic image encoder employed for compressively encoding first and second signals representing respective first and second views of a stereoscopic image, comprises: providing a first histogram of the first view and a second histogram of the second view, the first and second histograms representing a frequency of occurrence of a characteristic component of the first and second views, respectively; comparing the first histogram of the first view with the second histogram of the second view and estimating the mismatch in gain, a, and mismatch in offset, b, between the first and second views; correcting the stereoscopic image by multiplying the gain a and the second signal to obtain a gain corrected second signal for the stereoscopic image and adding the offset b to the gain corrected second signal to obtain a gain and offset corrected second signal, the gain and offset corrected second signal being obtained prior to encoding to increase encoding efficiency. The quality of the resulting stereoscopic image formed from decoding the first signal and gain and offset corrected second signal is greatly improved.

50 Claims, 9 Drawing Sheets

LEFT VIEW HISTOGRAM

RIGHT VIEW HISTOGRAM

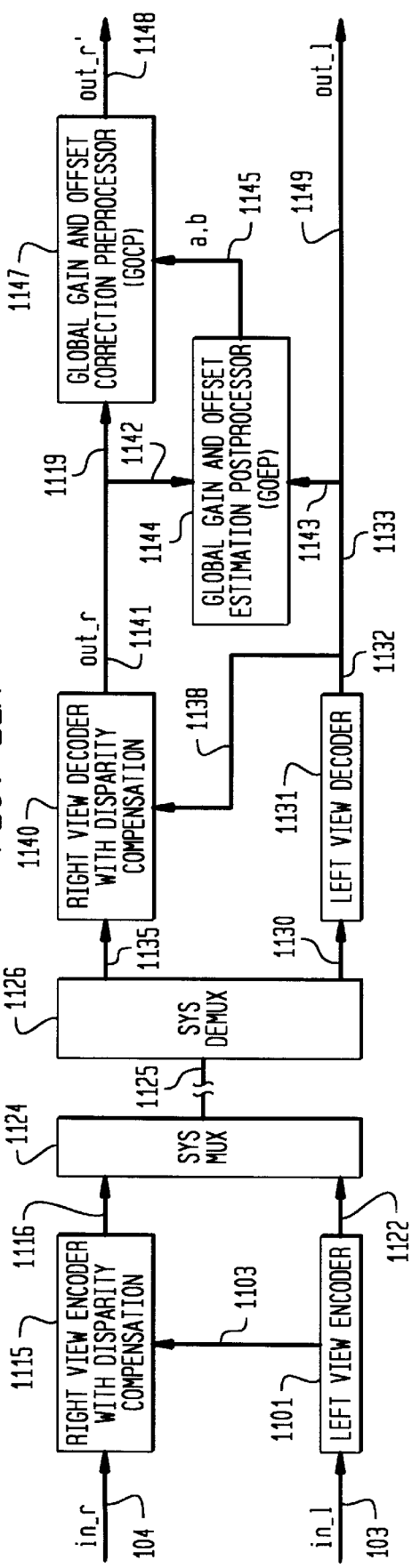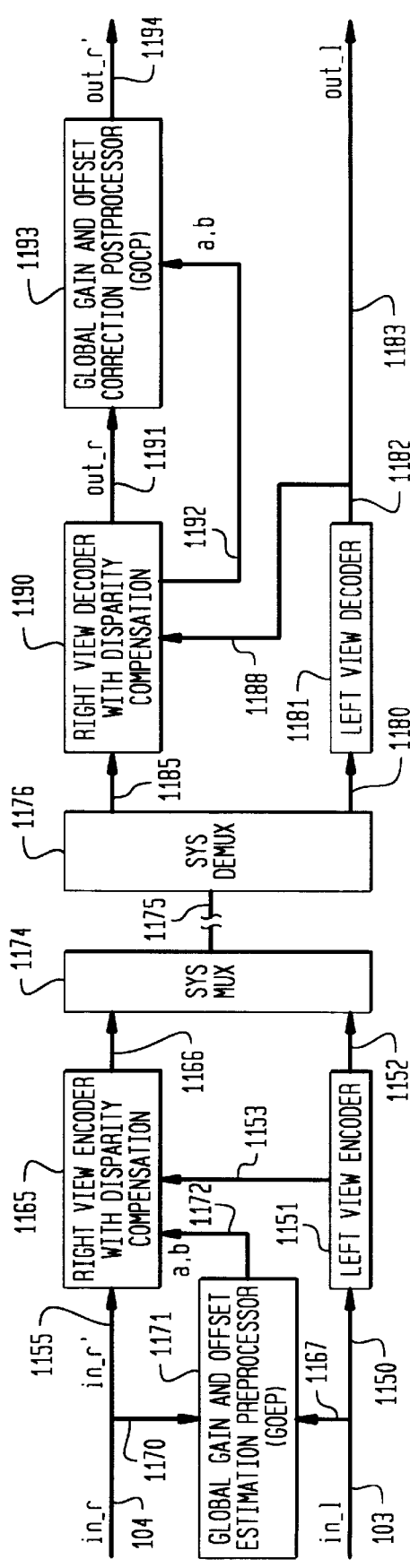

GAIN AND OFFSET CORRECTION FOR EFFICIENT STEREOSCOPIC CODING AND IMPROVED DISPLAY

RELATED APPLICATIONS

This application claims the benefit of provisional U.S. Patent Application Ser. No. 60/009,315 filed Dec. 29, 1995.

FIELD OF THE INVENTION

This invention relates generally to stereoscopic and multi-view video and display systems, and more particularly, to a method and apparatus for digitally correcting mismatch in gain and offset parameters to correct color and brightness differences between two views of stereoscopic video. The method and apparatus improves not only the coding efficiency of resulting corrected views forming stereoscopic video but, also the displayed quality of stereoscopic video.

The techniques of this invention can be particularly advantageous in improving the coding efficiency in compatible stereoscopic coding, where one view of stereoscopic video called the compatible view is coded independently, whereas the other view is coded dependently with respect to the compatibly coded view.

BACKGROUND OF THE INVENTION

Although the human visual system can naturally capture the three dimensional world, most imaging and display systems limit our abilities by presenting only a two dimensional (2D) mapping of the three dimensional (3D) world. Many current as well as emerging applications can significantly benefit from the high degree of realism provided by 3D scenes with depth. In fact, human ability to perceive realism in a scene is directly related to our ability to perceive depth accurately in a scene. A real 3D scene can be reconstructed from many 2D views of a scene imaged from different perspectives. Such a representation would not only allow the perception of depth in a scene but look-around capability as well. However, due to practical display constraints, although only a less complex solution employing two views of a scene is easily realizable, it can still impart the sensation of depth. These two views are required to be imaged under specific constraints and specifically, one view is intended for each respective eye of a human visual system so that a human brain can generate the depth information necessary to perceive realism. The two views together represent stereoscopic video where each view is similar to normal video except for the fact that the two views are related under the constraints imposed by stereoscopic vision. Under specified constraints, the two views imaging a scene differ by what is known as disparity between the views, which is typically only a few pixels in vertical direction, but can be of the order of about 40 pixels or higher in the horizontal direction, assuming each view is imaged at normal TV resolution.

Stereoscopic video has potential applications in education, training, 3D movies/entertainment, medical surgery, videoconferencing, virtual travel and shopping, multimedia presentations, video games and immersive virtual reality experiences, and others. Although, the potential applications of 3D/stereoscopic video are many, there are several challenges to be overcome before its potential can be truly harnessed and its use becomes wide spread. Currently the two primary challenges are: a convenient stereoscopic/3D display, and, a highly efficient compatible coding scheme. Regarding the issue of displays, most practical means of displaying stereoscopic/3D video requires viewers to wear specialized viewing glasses. These viewing glasses may be active shuttered glasses, which contain electronics, or passive polarizing glasses, which are somewhat less cumbersome. Although some displays not requiring specialized viewing glasses (autostereoscopic systems) are available, they impose other restrictions, e.g., viewing zones and discreteness of views and may typically require between 10 and 20 views for realism. Stereoscopic video, on the other hand, although it requires use of specialized glasses, can impart perception of depth in a scene and uses only two views, left-view intended for the left-eye and right-view intended for right-eye of a human visual system in either time-sequential (with active synchronized shuttered glasses) or time-simultaneous (with passive polarizing glasses). Besides the display issue, the other main issue is that of efficient digital compression of 3D/stereoscopic video so that the multiple views can be easily manipulated, stored or transmitted as needed. Towards that end, interworking with existing or emerging standards based coding schemes as well as existing displays for normal video is a necessity in many applications. Of particular relevance is the second phase of ISO Moving Pictures Experts Group (MPEG-2) video coding standard, which offers a good solution to a large variety of applications requiring digital video including broadcast TV via satellite, cable TV, HDTV, digital VCRs, multipoint video and others.

As is well known, techniques based on or extending from basic MPEG-2 video coding increases coding efficiency. Basic video coding in MPEG-2 involves motion-compensated DCT coding of frame- or field-pictures and is dealt with in detail in A. Puri, "Video Coding Using the MPEG-2 Compression Standard," Proceedings of SPIE Visual Communications and Image Processing, Boston, Mass., November 1993, pp. 1701–1713, and in R. L. Schmidt, A. Puri and B. G. Haskell, "Performance Evaluation of Nonscalable MPEG-2 Video Coding," Proceedings of SPIE Visual Communications and Image Processing, Chicago, Ill., September 1994, pp. 296–310 the contents and disclosure of both references which are expressly incorporated by reference herein.

In the past, several attempts have been made to reduce the bandwidth of digital stereoscopic video. Among the more promising methods presented recently are the methods which are based on or are extensions of MPEG-2 video coding. These methods typically employ either compensation of disparity on block by block basis between the two views or use both motion and disparity compensation, also on a block by block basis. However, it has been determined that for some stereoscopic video scenes, disparity compensation does not work very well, attributable to significant global differences in brightness and in color between the two views of a stereoscopic scene.

It would therefore be highly desirable to correct for differences in brightness and in color between the two views of a stereoscopic scene and perform the corrections globally for the sake of compatibility with MPEG-2 based coding of stereoscopic video.

It would also be highly desirable to correct for global mismatch in gain and offset between the left- and the right-views of stereoscopic video due to differences in imaging cameras, the differences in imaging sensors of cameras, differences in brightness and color balance adjustments of the sensors etc. Moreover, separate mismatch correction for global gain and offset for each of the three component signals, luminance, Y, and color signals, Cr and Cb, would be highly desirable.

SUMMARY OF THE INVENTION

This invention is primarily concerned with the issue of digital correction of mismatch between views of stereoscopic video resulting in highly efficient compression and improved quality of displayed views. Besides application of stereoscopic views, the techniques of this invention can be easily extended to coding of more than two views (here, referred to as multi-views). While it is possible to encode each of the two views of stereoscopic video separately (simulcast), a combined (joint) coding of two views is usually more efficient, since the two views are very related and contain significant redundancies which can be exploited for compression. It is possible to achieve joint coding of stereoscopic video by two basic approaches: The first approach results in compatibility with normal video in the sense that one view of stereoscopic video may be decoded for normal video display, while both views could be decoded for stereoscopic display. The second approach involves joint coding without regard to compatibility with monoscopic video, and presumably a higher degree of compression may be achieved. Any of the two coding approaches can be used with the instant invention.

Furthermore, the invention increases the coding efficiency of earlier proposed techniques based on or extending from basic MPEG-2 video coding, and thus, offers a compatible solution for future digital broadcast 3DTV. For instance, temporal scalability in MPEG-2 involves coding of video as two layers in time, such that the first layer, called base-layer, can be decoded independent of the second layer, called the enhancement-layer. The base-layer can be coded with any coder, such as, motion compensated DCT coders of H.261, MPEG-1 or basic MPEG-2, while the enhancement layer also uses the motion compensated DCT structure but with temporal prediction from the base-layer.

Thus, the inventive high level compatible stereoscopic codec structure is flexible with respect to the coders that may be used for independently and dependently coded views. For the sake of an example, assume the left-view is coded independently and the right-view is coded dependently. Now, the left-view could be coded by a nonscalable MPEG-2 coder, a main-profile coder, whereas the right-view could be coded with an MPEG-2 Temporal Enhancement Encoder, like the one used in Temporal Scalability. In fact, in the ongoing work in MPEG-2 on stereoscopic video coding, a stereoscopic video coding structure derived from temporal scalability as described in Puri, L. Yan and B. G. Haskell, "Temporal Resolution Scalable Video Coding," Proceedings of IEEE International Conference on Image Processing, Austin, Tex., November 1994, pp. 947–951 and A. Puri, R. V. Kollarits and B. G. Haskell, "Stereoscopic Video Compression using Temporal Scalability" Proceedings of SPIE Visual Communications and Image Processing, Taipei, Taiwan, May 1995, the contents and disclosure of both references which are expressly incorporated by reference herein, may be used. This subject matter is additionally described in co-pending U.S. patent application Ser. No. 08/452,463, entitled "Digital 3-D Stereoscopic Video Compression Technique Utilizing Disparity and Motion Compensated Predictions" and co-pending U.S. patent application Ser. No. 08/452,464, entitled "Digital 3-D Stereoscopic Video Compression Technique Utilizing Disparity Estimates" the contents and disclosure of both applications are expressly incorporated by reference herein. Thus, although examples are provided herein using MPEG-2 video coding context, the invention is equally relevant to currently ongoing work in MPEG-4. Another example, more applicable in the future, may use basic MPEG-2 video coding for left-view and perhaps an MPEG-4 coder optimized for disparity/motion compensated coding of right-view. Alternatively, an ITU-T's H.263 based coder or a basic MPEG-4 coder may be used for left-view with right-view coded using an optimized MPEG-4 utilizing disparity/motion compensated coding.

The invention particularly relates to improvements in methods for digital compression of stereoscopic/3D video by correcting for mismatch in imaging parameters such as, gain and offset differences between the two views which constitute stereoscopic video. In particular, gain and offset differences not only for luminance but also for color components are corrected; thus, mismatch in brightness and/or color balance between the two views of a scene due to differences in imaging parameters is rectified. This not only leads to increase in compression efficiency when coding stereoscopic video but also results in improvements in quality of displayed stereoscopic video.

For stereoscopic scenes, one view of the scene can be used as the reference signal and digital correction of the other view for mismatch needs to be performed. This correction for mismatch allows improved prediction between the views and thus contributes to overall coding efficiency. Typically, compatible coding is performed allowing either standalone decoding of one layer for display on normal displays or decoding of both layers, the standalone layer and the layer coded with respect to it, for display on stereoscopic displays.

Three example methods for estimation of gain and offset mismatch parameters between left and right views are described. They differ in assumptions that they make regarding uniqueness of characteristics of histograms, stationarity of image statistics and geometrical matching of shapes of histograms. The first method involves determination of unique characteristics in both both left-view and right-view histograms and works well when such unique characteristics can be identified. The second and third methods are more general with the second method relying purely on linear minimization of mean square error estimates between gain corrected right-view signal and left-signal, and the third method using geometrical appearance of histograms for matching and relying on first and second order moments of histograms. It turns out that although the underlying assumptions in gain and offset estimation in the three methods are somewhat different, they rely on the same basic approach for gain and offset correction.

In the basic scheme described herein, from among the two views constituting stereoscopic video, one view, e.g., the left-view, is used as reference. The other view, e.g., the right-view, is then corrected for gain and offset mismatch independently on the luminance and the two chrominance components. In the first approach, mismatch correction is applied globally prior to coding and thus compatibility with MPEG-2 Temporal Scalability based stereoscopic coding is maintained. This approach not only results in increased coding efficiency when using a two layer Temporal scalability based codec structure, but also results in improvement of displayed quality due to reduction in mismatches between left- and right-views.

In another approach, mismatch estimation and correction may be performed at the decoder as a postprocessing operation prior to display and not prior to coding; this improves only the display quality but does not improve the coding efficiency. Sometimes, to minimize complexity of decoder/display processing, it may not be practical to estimate mismatch at the decoder/display processor, while correction of mismatch which does not require significant computational complexity may be possible at the decoder. In these instances, gain and offset estimation may be performed at the encoder and these global parameters which require a minimal overhead may be transmitted either at scene cuts, group-of-pictures, or on a picture basis in the bitstream. These parameters would be extracted by the decoder which provides them to postprocessor for correction.

Although examples are presented primarily in context of gain and offset correction for MPEG-2 based compatible stereoscopic coding, the generalized codec structure described is equally applicable to currently ongoing work in MPEG-4 on stereoscopic/multi-view coding.

BRIEF DESCRIPTION OF THE DRAWINGS

Reference may now be had to a preferred embodiment of the gain and offset correction apparatus and method of the invention, taken in conjunction to the accompanying drawings, in which:

FIG. 11A shows a high level block diagram of a Stereoscopic Video Codec employing Global Gain and Offset Estimation and Correction Postprocessing, arranged in accordance with the invention.

FIG. 11B shows a high level block diagram of a Stereoscopic Video Codec employing Global Gain and Offset Estimation Preprocessing and Global Gain and Offset Correction Postprocessing, arranged in accordance with the invention.

DETAILED DESCRIPTION OF THE INVENTION

Figure 1:
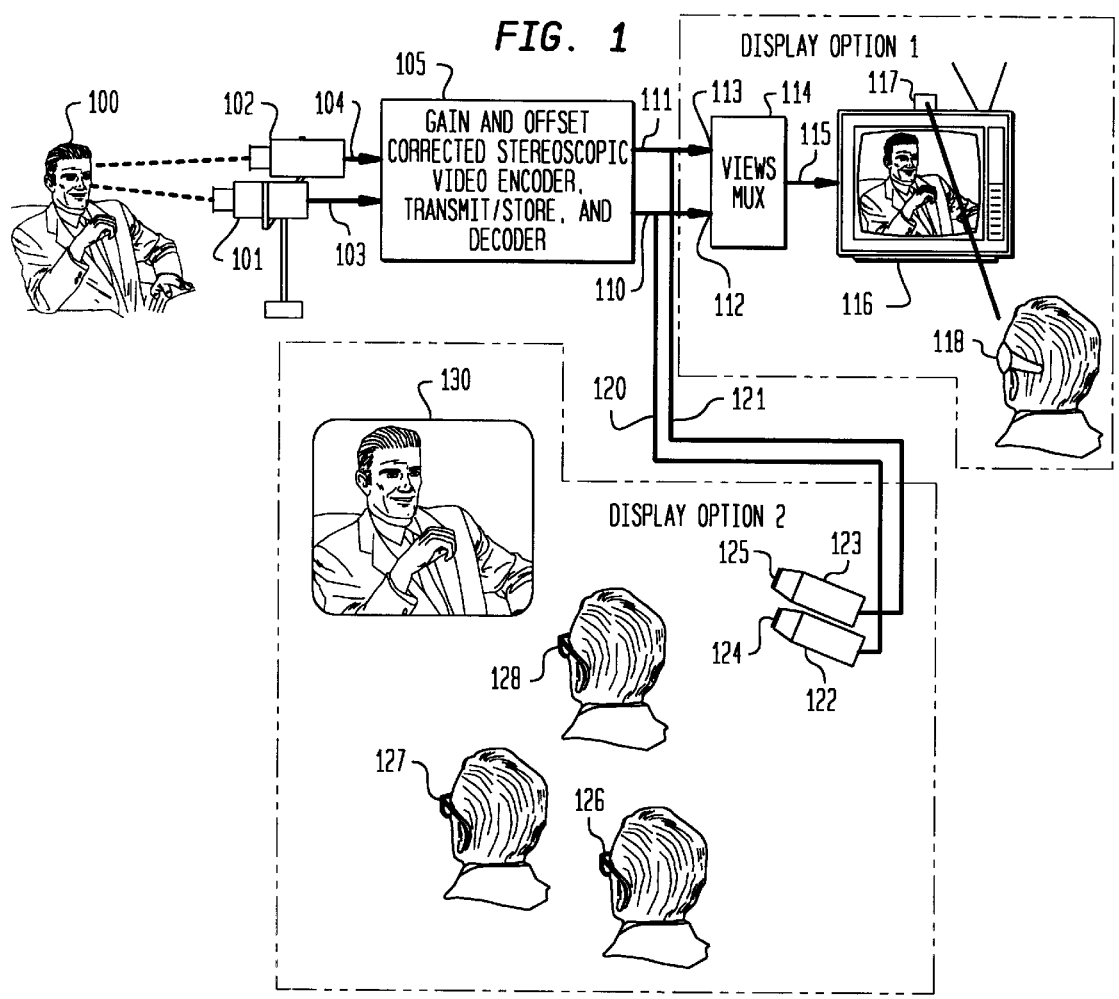
FIG. 1 shows a simplified diagram of principle of stereoscopic imaging, gain corrected compression, and display, in accordance with the invention.

We now describe in detail, the framework, apparatus and methods of this invention to yield highly efficient compression of stereoscopic video while preserving compatibility with normal video displays as well as improving the quality of displayed stereoscopic video.

Method 1

This technique applies to images having histograms with at least two uniquely identifiable points with significantly different amplitudes, for example, "very dark" and "very bright" contents. Such points are usually found in red, green, blue and luminance (Y) histograms and less frequently in histogram of color components such as, Cb and Cr. Examples of well behaved histograms for left- and right-views of stereoscopic video are respectively shown in FIG. 4A and FIG. 4B. The important features of these histograms are that the maximum and minimum levels are not populated or are very sparsely populated and well defined end points and peak points exist. Using the left-view as reference, gain and offset values that must be applied to the right-view to correct for mismatch can be obtained by solving two simultaneous equations utilizing a pair of unique matching points in the two histograms.

Let $x_{L1}$ and $x_{L2}$ be the two unique points on left-view image histogram and the corresponding matching points on right-view image histogram be $x_{R1}$ and $x_{R2}$. If gain and offset values of the right-view image with respect to the left-view image are given by a and b, respectively, the two simultaneous equations of interest are $X_{L1}=ax_{R1}+b$ and $x_{L2}=ax_{R2}+b$. Rewriting the second equation, offset is given as $b=x_{L2}-ax_{R2}$. Substituting this equation in the first equation results in gain $$a = \frac{x_{L1} - x_{L2}}{x_{R1} - x_{R2}}.$$

Method 2

There are other general techniques that are more applicable and unlike Method 1 do not require identification of unique feature points that match in left- and right-view histograms. One such method is based on use of linear regression to minimize mean square error. Let a be the gain and b be the offset of right-view image with respect to left-view image used as reference. Then assuming random variables, a generalized approach for estimating a random variable by a function of another random variable can be used and the problem of determining a and b can be reduced to mean square estimation. In particular, an estimation of left-view can be made from the right-view as $\tilde{x}_L=ax_R+b$, where the estimation error can be written as $e=\tilde{x}_L=(x_L-(ax_R+b))$.

The mean square error is computed as the expected value of the square of error, that is $E(e^2)=\xi=E(x_L^2+(ax_R+b)^2-2x_L$ $(ax_R+b))$. Solving this equation results in $\xi = E(x_L^2) + a^2 E(x_R^2) + b^2 + 2abE(x_R) - 2aE(x_L x_R) - 2bE(x_L)$. To minimize mean square error, a partial derivative with respect to a is first computed and set to zero:

$$0 = \frac{\partial \xi}{\partial a} = aE(x_R^2) + bE(x_R) - E(x_L x_R), \text{ or}$$

$$bE(x_R) = E(x_L x_R) - aE(x_R^2).$$

Next, a partial derivative with respect to b is computed and set to zero:

$$0 = \frac{\partial \xi}{\partial b} = b + aE(x_R) - E(x_L), \text{ or } b = E(x_L) - aE(x_R).$$

By combining the two partial derivative equations a new expression for a results: a=

$$a = \frac{E(x_L x_R) - E(x_L)E(x_R)}{E(x_R^2) - (E(x_R))^2}.$$

In practice, the various E( ) terms in the above equations can be replaced by the statistical moments of histograms. We use notation $I_{1L}$, $I_{1R}$, $I_{2R}$ and $I_{2LR}$ to respectively denote the first left moment, the first right moment, the second right moment and the joint moment between corresponding left- and right-images. With this substitution, the following equations result: $b = I_{1L} - aI_{1R}$, and $$a = \frac{I_{2LR} - I_{1L}I_{1R}}{I_{2R} - (I_{1R})^2}.$$

One way to compute moments $I_{1L}$, $I_{1R}$, $I_{2R}$ and $I_{2LR}$ is via use of histograms, another way is to directly compute these values without reference to histograms. Since we use histogram based approach in the next method, the necessary equations for histogram based approach are:

$$I_{1L} = \sum_i x_{Li} p(x_{Li}); \quad (I)$$

$$I_{1R} = \sum_i x_{Ri} p(x_{Ri}); \quad (ii)$$

$$I_{2R} = \sum_i x_{Ri}^2 p(x_{Ri}); \quad (iii)$$

and $$I_{2LR} = \sum_i x_{Li} x_{Ri} p(x_{Li} x_{Ri}), \quad (iv)$$

where $p(x_i)$ represents the frequency of occurrence of event $x_i$ here I takes values in 0 to 255 range and $x_i$ is same as I.

Method 3

This method is based on matching the geometrical properties of left- and right-view histograms and implicitly minimizes error unlike the second method. Now to determine gain, a,. and offset, b, by this method, we require that first and second moments of left-view and corrected right-view images to be equal.

Equating the first moments, $E(x_L) = aE(x_R) - b$, from which offset, b, can be rewritten as, $b = E(x_L) - aE(x_R)$. Similar to method 2, the E( ) terms can be replaced by the appropriate statistical moments, $I_{1L}$ or $I_{1R}$, resulting in $b = I_{1L} - aI_{1R}$.

Equating the second moments, $E(x_L^2) = E(ax_R + b)^2$, and solving this equation by recognizing that expectation E( ) is a linear operation, results in $E(x_L^2) = a^2 E(x_R^2) + 2abE(x_R) + b^2$. Substituting b from the offset equation above into this equation, results in $E(x_L^2) = a^2 E(x_R^2) + 2aE(x_R)[E(x_L) - aE(x_R)] + [E(x_L) - aE(x_R)]^2$. Further solving this equation results in $E(x_L^2) = a^2 E(x_R^2) + (E(x_L))^2 - a^2 (E(x_R))^2$. Finally, gain a can be derived by rewriting this equation:

$$a = \sqrt{\frac{E(x_L^2) - (E(x_L))^2}{E(x_R^2) - (E(x_R))^2}}.$$

Again, replacing expectation E( ) by appropriate statistical averages as in method 2, we get, $$a = \sqrt{\frac{I_{2L} - (I_{1L})^2}{I_{2R} - (I_{1R})^2}},$$

where, $I_{2L}$ is the second moment of left-view image and $I_{2R}$ is the second moment of the right-view image.

Referring to FIG. 1 shows a typical stereoscopic video imaging, processing and display system. A scene, 100, is captured by a stereoscopic camera composed of individual camera or lenses 101 and 102, where camera 101 generates left-view of the scene and camera 102 generates the right-view of the scene. In a stereoscopic video system, the left-view is intended for the left-eye and the right-view is intended for right-eye of a human viewer. The left- and right-views at lines 103 and 104 are digitized, gain and offset mismatch corrected and coded for efficient representation for transmission or storage and are then decoded for display. The operations of encoding, transmission/storage and decoding are represented by 105, at whose output, the decoded left-view and the right-views are available on lines 110 and 111. There are two ways of displaying the output, the first one, time multiplexed with active viewing LCD shutter eyeglasses, and the second one, time simultaneous with passive polarizing eyeglasses. In display option 1, the left- and the right-views on lines 112 and 113 are time multiplexed sequentially in 114 to form a sequence output at 115 composed of left-view frame, right-view frame and so on. The signal on line 115 is input to a stereo-ready monitor or TV receiver 116 which uses a shutter synchronizer 117 to control timing of when the left and right views are presented to human visual system by LCD shuttering glasses 118. In the display option 2, the left and right views are input to projectors 122 and 123 over lines 120 and 121, respectively. Projectors 122 and 123 have polarizing filters 124 and 125 placed on lenses, these polarizers are either both linear or both circular and are matched to the passive eyeglasses 126, 127 and 128. Thus, if linear polarizers are chosen, the filter 124 on projector 122 is linear and its polarization direction is orthogonal to that of filter 125 on projector 123 that is also linear polarized. Likewise, the left lens and the right lens of passive eyeglasses 126, 127, 128 have linear polarizing filters that are orthogonal, respectively. The image of scene 100 is formed on screen 130 which has metallic content to preserve the direction of polarization.

Figure 2:
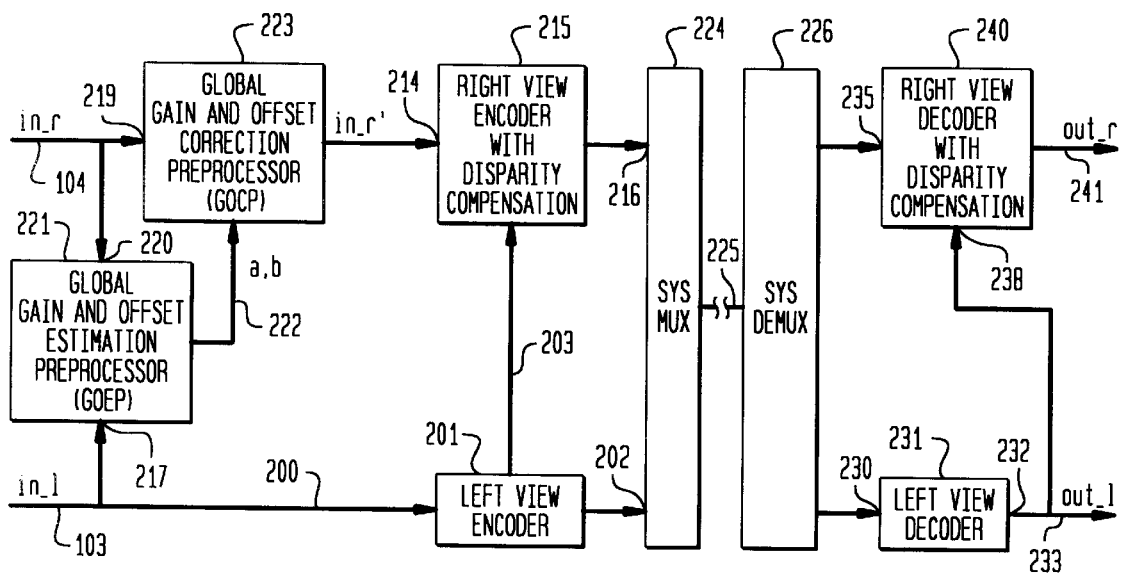
FIG. 2 shows a high level block diagram of a Stereoscopic Video Codec employing Global Gain and Offset Estimation and Correction Preprocessing, arranged in accordance with the invention.

In FIG. 2, we show a generalized block diagram of a compatible stereoscopic codec employing gain and offset estimation and correction as a preprocessing operation. The left-view on line 103 is input to Left View Encoder, 201, via line 200. This Encoder outputs a coded bitstream on line 202 and locally reconstructed frame on line 203. The right-view is available on line 104 and is input on line 219 to gain correction in Global Gain and Offset Correction Preprocessor (GOCP). 223, which outputs gain corrected right-view frames on line 214 which forms the input to a Right View Encoder with Disparity Compensation, 215, which outputs coded bitstream on line 216. Both the bitstreams on lines 202 and 216 are multiplexed by a System Multiplexer and packetized for transmission or storage on channel 225. At the receiver, a System Demultiplexer, 216, unpacketizes and separates each of the bitstreams and offers on line 230, left-view coded bitstream to Left view Decoder, 231, and right-view coded bitstream on line 235 to Right View Decoder with Disparity Compensation, 240. Both the Right View Encoder, 215, and the Right View Decoder, 240 use decoded left view signals, 203, used in Right View Encoder and 238 used in Right View Decoder for disparity estimation and compensation. Earlier, we mentioned that GOCP, 223, corrects for gain and offset mismatch of right-view with respect to left-view. It uses gain parameter, a, and offset parameter, b, both on line 222 for correction of mismatch. These parameters are computed in Global Gain and Offset Estimation Preprocessor (GOEP), 221, which takes as input, left-view frames on line 217 and right-view frames on line 220 and outputs on line 222 gain and offset parameters.

Figure 3:
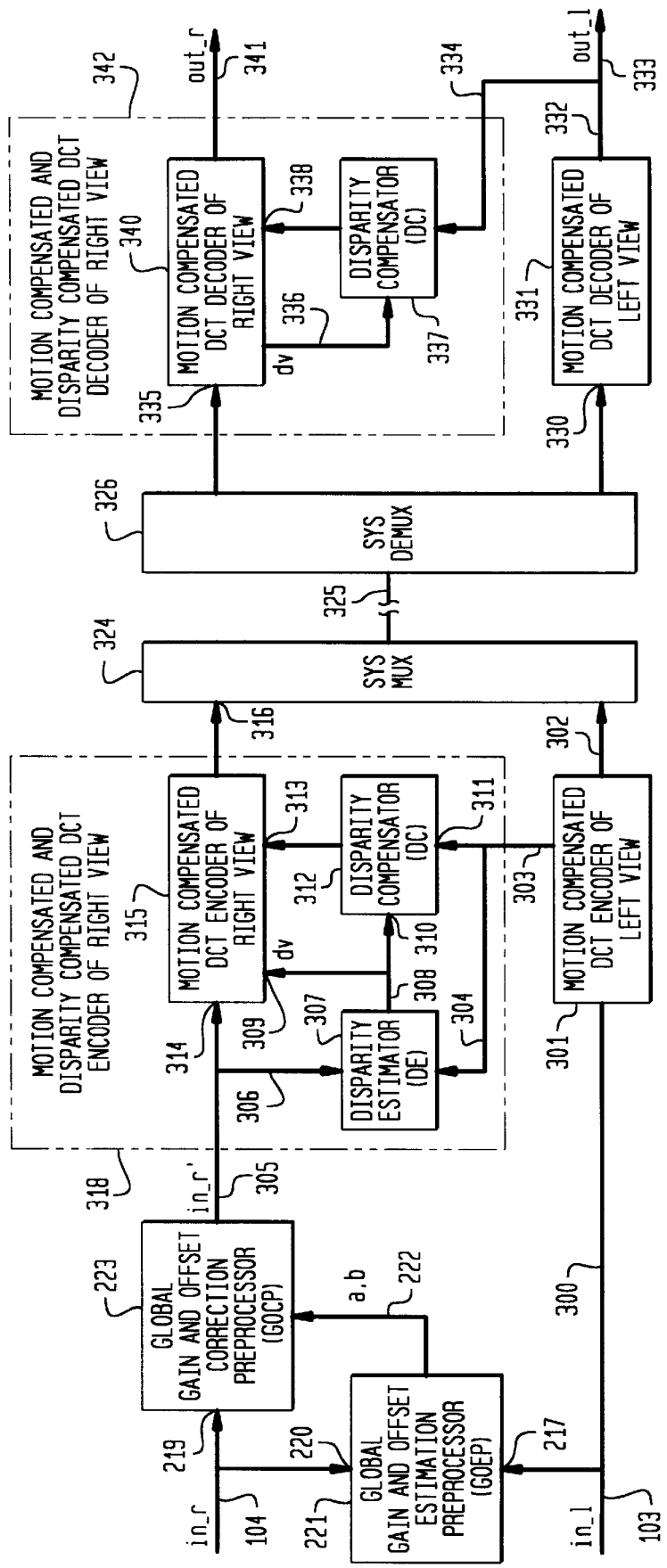
FIG. 3 shows an example block diagram of an MPEG-2 based Stereoscopic Video Codec employing Global Gain and Offset gain and offset first method for Corrected Preprocessing arranged in accordance with the invention.

FIG. 3 shows an example block diagram of a stereoscopic video codec of this invention and is based on the basic two layer codec structure explained in FIG. 2. The main difference with respect to FIG. 2 is that a specific form of encoder and decoder is shown as an example for coding of left view. The encoder for coding left-view is a Motion Compensated DCT Encoder, 301, and the corresponding decoder is Motion Compensated DCT Decoder, 331. To be more specific, an MPEG-1 or a nonscalable MPEG-2 encoder/decoder could be used for coding of left-view. The left-view is input to encoder on line 301, via line 300. This Encoder outputs a coded Bitstream on line 302 and locally reconstructed frame on line 303. The gain corrected right-view is applied via line 314 to Motion and Disparity Compensated DCT Encoder, 318, which outputs on line, 316, coded Bitstream representing the right-view. The encoder 318 consists of a modified Motion Compensated DCT Encoder 315, Disparity Estimator (DE), 307, and a Disparity Compensator (DC), 312. The left-view frames become available on line 303 and are used by DE, 307, which also uses gain and offset corrected right-view frames via line 306. The resulting disparity estimates are sent over line 308 and then via line 310 to DC, 312, which outputs a disparity compensated signal on line 313. On a block by block basis, disparity estimates, also called vectors are sent to encoder 315 and are sent in the Bitstream output on line 316. Note that encoder 315 is a B-picture like encoder with 3 modes and can either choose disparity compensation, motion compensation or an average of disparity and motion compensation on a block-by-block basis. The internal operations of Encoders, 301 and 315, and that of Decoders 331 and 340 are exactly identical to those described earlier in the above-referenced "Stereoscopic Video Compression using Temporal Scalability" article and in above-indicated co-pending U.S. patent application Ser. Nos. 08/452,463 and 08/452,464. The left and right bitstreams are multiplexed in Sys Mux, 324, sent over channel 325 and demultiplexed by Sys Demux 326 and offered to left- and right-view decoders. Line 330 carries the left-view coded bitstreams which are decoded by Motion Compensated Decoder 331 and output on line 333. The reconstructed left-frames are employed by DC, 337, which also uses decoded disparity vectors on line 336-. these vectors were obtained by modified Motion Compensated Decoder 340 via line 335. The disparity compensated signal is now output by DC, 337 on line 338 and is utilized by Decoder, 340, to reconstruct right-view frames which are output on line 341. The Decoder, 340 and DC, 337, together are referred to as Motion Compensated and Disparity Compensated DCT Decoder, 342. As an example, MPEG-2 Temporal scalability based, Temporal Enhancement Encoder and Decoder described in the above-referenced "Temporal Resolution Scalable Video Coding," article, can be utilized for coding of right-view. Since there is considerable flexibility in the codec structure described, in future, H.263 or, an MPEG-4 coder optimized for coding of generic video may be employed for left-view and either an MPEG-4 generalized scalability based enhancement coder or an MPEG-4 coder optimized for coding of noncompatible stereoscopic view may be used for coding of right-view.

Figure 4A:
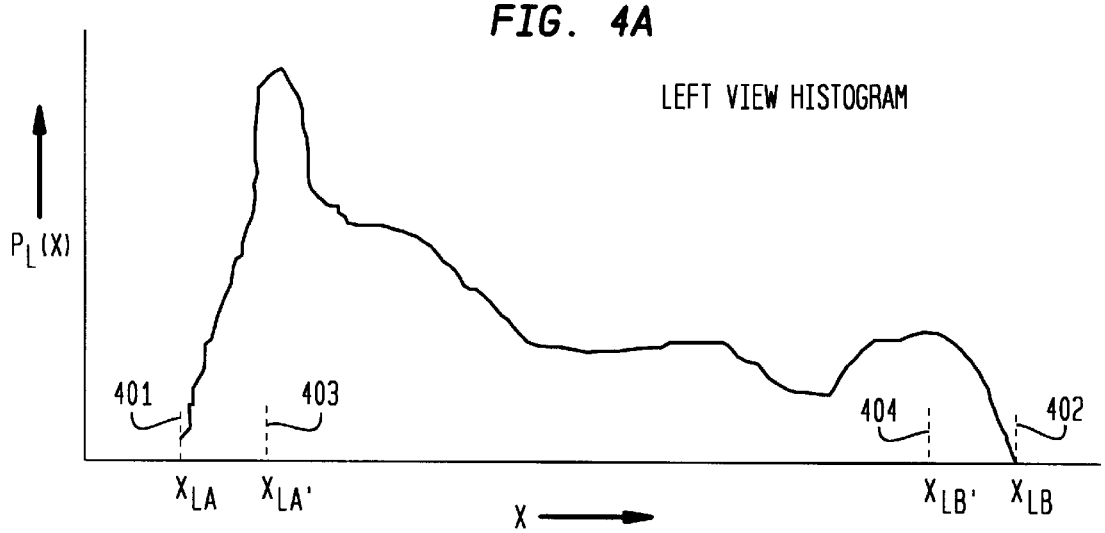
FIG. 4A shows an example of well behaved histogram of left-view of stereoscopic video.
Figure 4B:
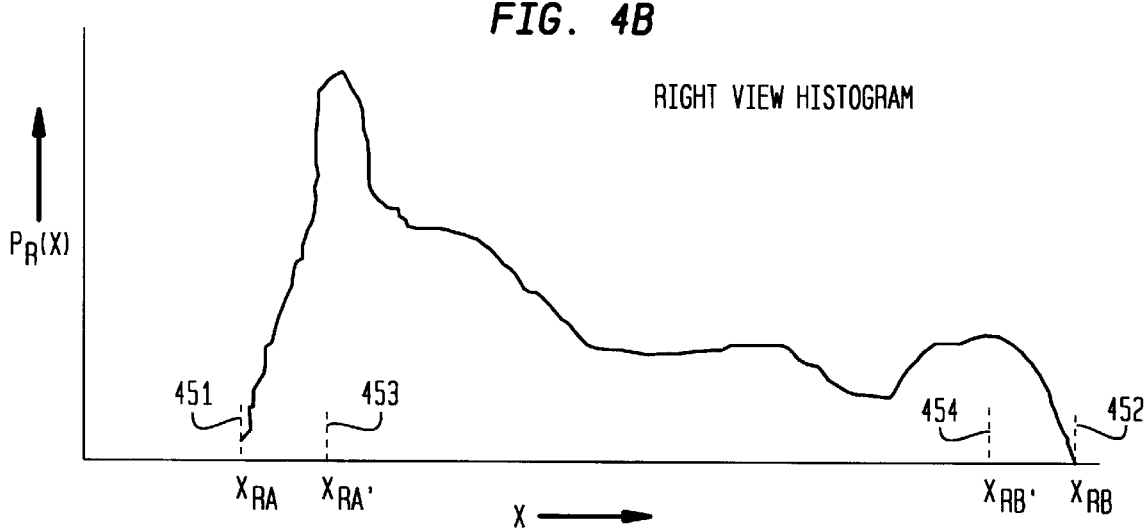
FIG. 4B shows an example of well behaved histogram of right-view of stereoscopic video requiring correction.

FIG. 4 shows examples of well behaved histograms of left-view and right-view of stereoscopic video. In FIG. 4A the Left View Histogram, 400, shows distinct characteristic points such as endpoints, 401 and 403 or/and other characteristic points such as distinct locations of global and local maximas, 403 and 404. In general, besides maximas, local minimas may also be present and can be used as characteristic points or feature points. In FIG. 4B the Right View Histogram, 450, shows distinct characteristic points such as endpoints, 451 and 453 or/and other characteristic points such as distinct locations of global and local maximas, 453 and 454. As before, besides maximas, local minimas may also be present and can be used as characteristic points. From FIG. 4A and FIG. 4B we can conclude that there are at least two distinct features in right-view histogram that match the corresponding distinct features of left-view histograms.

Figure 5:
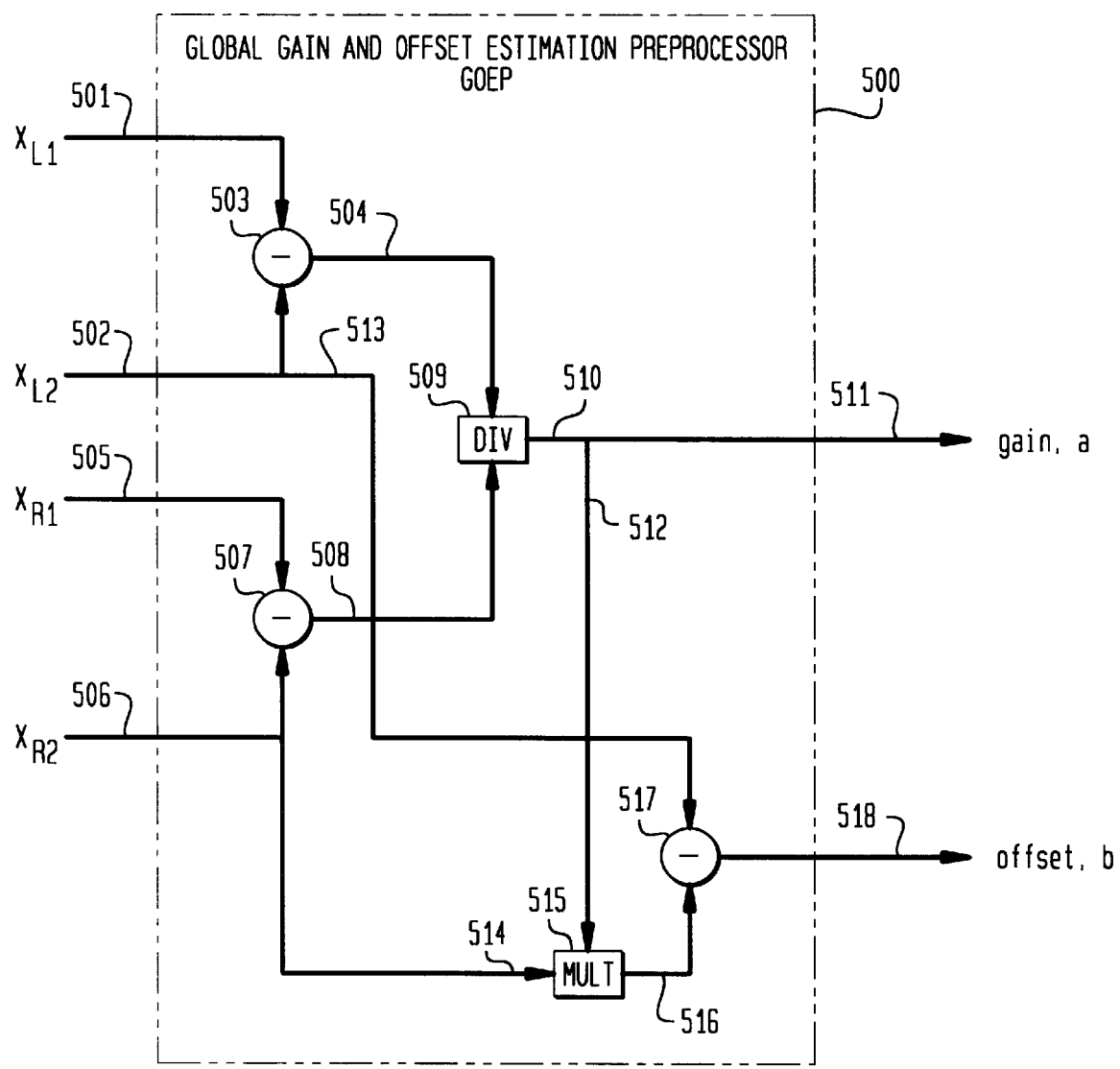
FIG. 5 shows a detailed block diagram of Global Gain and Offset Estimation Preprocessor based on the computation of gain and offset, arranged in accordance with the invention.

FIG. 5 shows a simplified block diagram of one example of Gain and Offset Estimation Preprocessor (GOEP), 500. This example is based on Method 1 for computing estimates of gain and offset and the GOEP of 500 is a straightforward implementation of global gain and offset mismatch calculations $$a = \frac{x_{L1} - x_{L2}}{x_{R1} - x_{R2}} \text{ and } b = x_{L2} - ax_{R2}.$$

Figure 6:
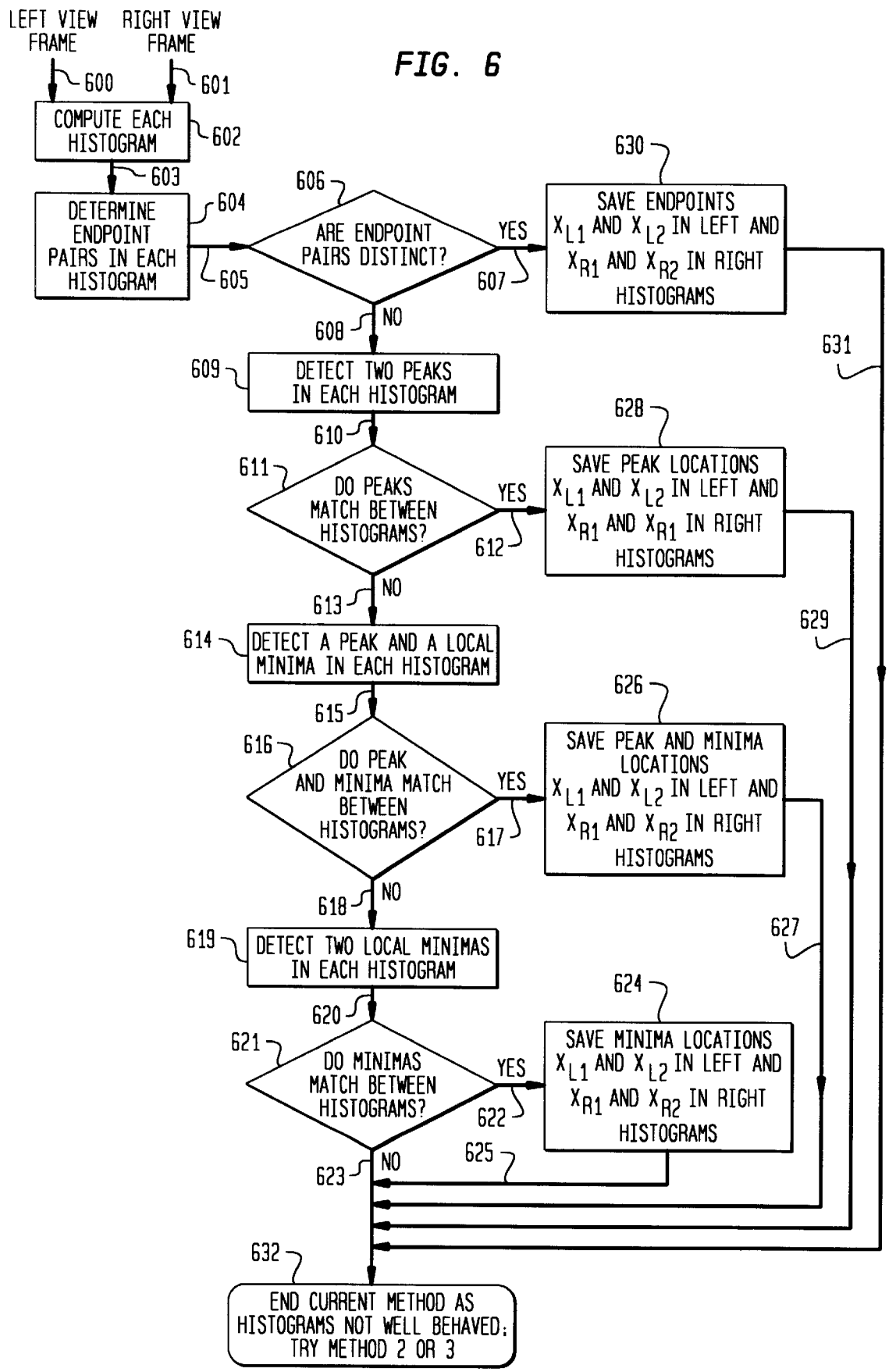
FIG. 6 shows a detailed flowchart for determining a pair of unique points needed for calculation of global gain and offset, arranged in accordance with the invention.

Assuming that location of two unique feature points $x_{L1}$ and $x_{L2}$, in left-view histogram that match corresponding feature points $x_{R1}$ and $x_{R2}$ in right-view histogram have been identified. The location of left view feature points are input on lines 501 and 502 whereas the location of right-view feature points are input on lines 505 and 506. Differencer 503 differences input on lines 501 and 502 and outputs the result on line 504 which forms one input to the divider element DIV, 509. Likewise, Differencer, 507, differences input on lines 505 and 506 and outputs the result on line 508, which forms the second input to divider DIV, 509, at whose output, is 511 is the gain parameter, a. The second feature points in left-view histograms is input via lines 513 to differencer 517, whereas, the second feature point in right-view histogram is input via line 514 to multiplier device MULT, 515, where it is multiplied by gain, a, available on line 512 and the result output on line 516. Line 516 forms the second input to the differencer 517, at whose output 517 is the offset parameter, b. FIG. 6 shows a flowchart that can be used to locate distinct feature points that match in the left- and right-view histograms. Locate feature points may require human interventions and may be difficult to automate in some cases. In other cases, when well behaved histograms exist like that in FIG. 4A an FIG. 4B, locating feature points is not difficult. In any event, an iterative procedure is probably the best one to try to locate feature points. The left-view is input via line 600 and the right-view input via line 601 to a processing unit, 602, that computes separate histograms of left and right-views. These histograms are analyzed in processing unit 604 to determine location of endpoint pairs in left-and right-histograms. In an analysis unit 606 it is determined if distinct endpoints have been found, and if so, the endpoints are saved, 630 and the processing concludes in 632. If analysis unit 606 determines that endpoint are not distinct, then a search for two peaks in processing unit 609 is carried out to find global peak (maxima) and local maxima in each of the two histograms computed in 602. Again, an analysis unit 611 determines if matching global and local maxima have been found in two histograms or not, and if they have been found, location of peaks are saved, 628, and the processing concludes in 632. Again, if required pair of matching maximas are not found, processing continues in unit 614 to determine a maxima and a minima in the two histograms. Next, analysis unit 619 decides if the procedure of 614 has been a success or not, and if yes, location of peaks is saved, 626, and the processing stops, 632. If analyzing unit 616 determines that a matching peak and minima have not been found between the two histograms, a search for two matching minimas in the two histograms is carried in 619, followed by analysis in 621, resulting in saving the location of pair of matching minimas, 624. Either way search is concluded in 632, and if no matching feature point pair has been found only then Method 2 or Method 3 (to be discussed) are tried. This procedure is separately followed for luminance and the two chrominance components.

Figure 7:
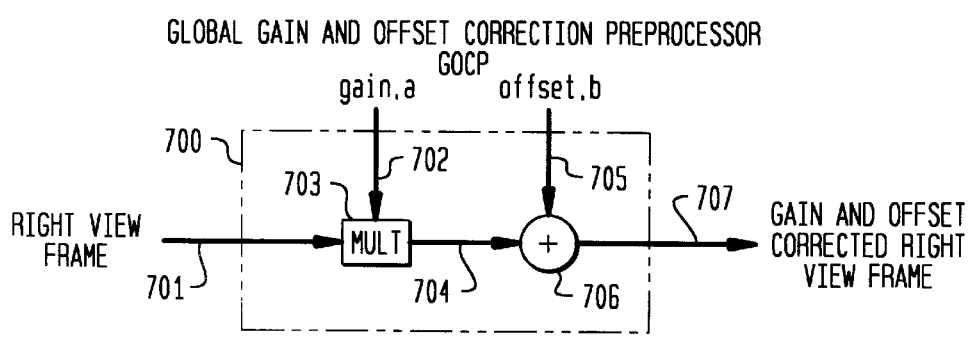
FIG. 7 shows a detailed block diagram of Global Gain and Offset Correction Preprocessor using gain and offset parameters, arranged in accordance with the invention.

FIG. 7 shows Global Gain and Offset Correction Preprocessor (GOCP), 700. The right-view is input on line 701 and forms one input to multiplier MULT, 703, at whose other input 702 is the gain factor, a. The output of MULT, 703, on line 704 is input to adder 706, at whose other input, 705, is the offset, b. The resulting gain and offset corrected right-view is output on line 707. This procedure is separately followed for luminance and the two chrominance components.

Figure 8:
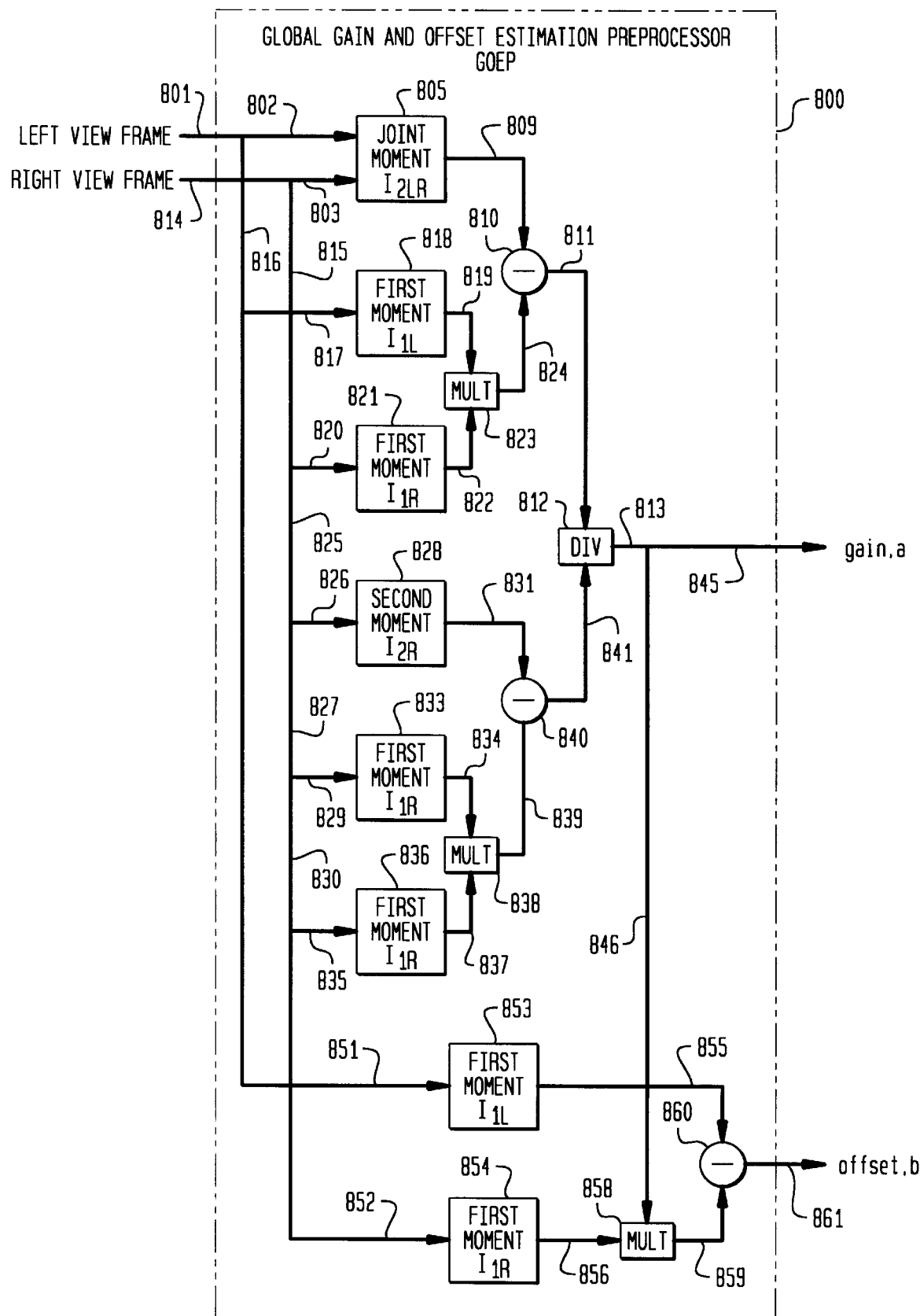
FIG. 8 shows a detailed block diagram of Global Gain and Offset Estimation Preprocessor based on the second method for computation of gain and offset, arranged in accordance with the invention.

FIG. 8 shows a simplified block diagram of another example of Gain and Offset Estimation Preprocessor (GOEP), 800. This example is based on Method 2 for computing estimates of gain and offset and the GOEP 800 is a straightforward implementation of equations $b = I_{1L} - aI_{1R}$, and $$a = \frac{I_{2LR} - I_{1L}I_{1R}}{I_{2R} - (I_{1R})^2}.$$

Left-view is input on line 801 and right-view on line 814, and are used by 805 to compute joint moment between left and right views, whose output is available on line 809 and forms one input to a differencer, 810. Simultaneously, left- and right-views are also used by 818 and 821 to respectively compute the first moments of left and right images. The output of 818 on line 819 and the output of 821 on line 822 form two input to multiplier MULT, 823, at whose output, 824, we have product of first moments of left- and right-views. This product forms the second input to differencer 810, whose output, 811, forms the first input to divider DIV, 812. Also, simultaneously, second moment of right-view is calculated in 828 and output via line 831 and forms one input to differencer 840. Furthermore, simultaneously, in 833 and 836 first moments of right-view are calculated and output on respective lines 834 and 837, which form the two inputs to MULT, 838, and outputs the product on line 839, the output on line 839 forms the second input to the aforementioned differencer 840, which outputs the difference on line 841. Incidentally, line 841 is the second input to the aforementioned divider DIV, 812 which finally outputs gain parameter, a, on to line 845. The offset parameter, b is computed next and uses the gain parameter, a, just computed. The left-view and right-view first moments are again calculated (alternatively precomputed moments from previous calculations could be used) in 853 and 854. Output of 853 is 855 and feeds one input of the differencer, 860. The output of 854 is available on line 856 and is multiplied in 858 with gain parameter, a, now available on line 846; the resulting output on line 859 forms the second input to differencer 860, which outputs offset parameter, b, on line 861.

FIGS. 9A, 9B, 9C and 9D show detailed block diagrams of computation of first moments, second moments and joint moments necessary in FIG. 8 (and later in FIG. 10). FIGS. 9A, 9B, 9C and 9D are corresponding straightforward implementations of the statistical moment calculation equations $$I_{1L} = \sum_i x_{Li} p(x_{Li}); \; I_{1R} = \sum_i x_{Ri} p(x_{Ri}); \; I_{2R} = \sum_i x_{Ri}^2 p(x_{Ri}); \text{ and}$$

$$I_{2LR} = \sum_i x_{Li} x_{Ri} p(x_{Li} x_{Ri}).$$

Figure 9A:
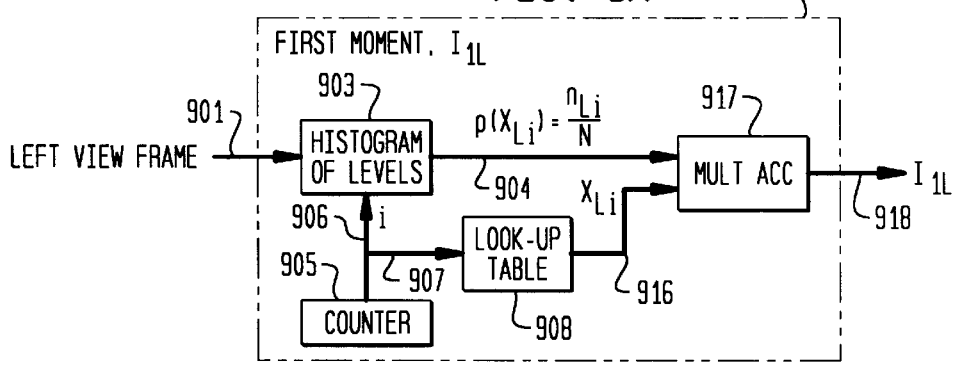
FIG. 9A shows a detailed block diagram for calculating the First Moment, $I_{1L}$, needed in estimation of global gain and offset, arranged in accordance with the invention.

In FIG. 9A, left-view is input on line 901 from which a histogram of levels is computed in device 903. A counter, 905, which takes values from 0 to 255, outputs a level, one-at-a-time on line 906 which is used to index the histogram in 903. The output 904 of the histogram computing device 903 is the relative frequency of occurrence of the level on line 906. Quite simultaneously, the level on line 906 is also applied on line 907 to a lookup table, 908, which outputs on line 916, a value same as input value on line 907. Both lines 904 and 916 are inputs to a multiply accumulator MULT ACC, 917 which repeats the loop for all values of counter before outputting the result on line 918.

Figure 9B:
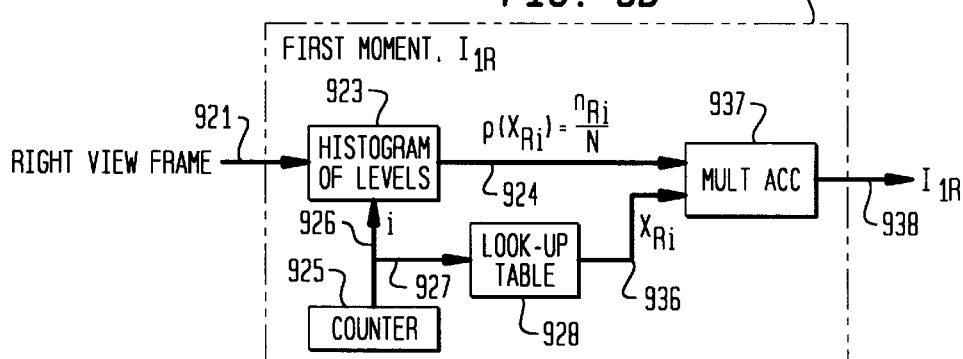
FIG. 9B shows a detailed block diagram for calculating the First Moment, $I_{1R}$, needed in estimation of global gain and offset, arranged in accordance with the invention.

Next the operation of FIG. 9B is now described in which right-view is input on line 921 from which a histogram of levels is computed in 923. A counter, 925, which takes values from 0 to 255, outputs a level, one-at-a-time on line 926 which is used to index the histogram in device 923. The output on line 924 is the relative frequency of occurrence of the level on line 926. Quite simultaneously, the level on line 926 is also applied on line 927 to a lookup table, 928, which in our case outputs on line 936, a value same as input value on line 927. Both lines 924 and 936 are inputs to a multiply accumulator MULT ACC, 937 which repeats the loop for all values of counter before outputting the result on line 938.

Figure 9C:
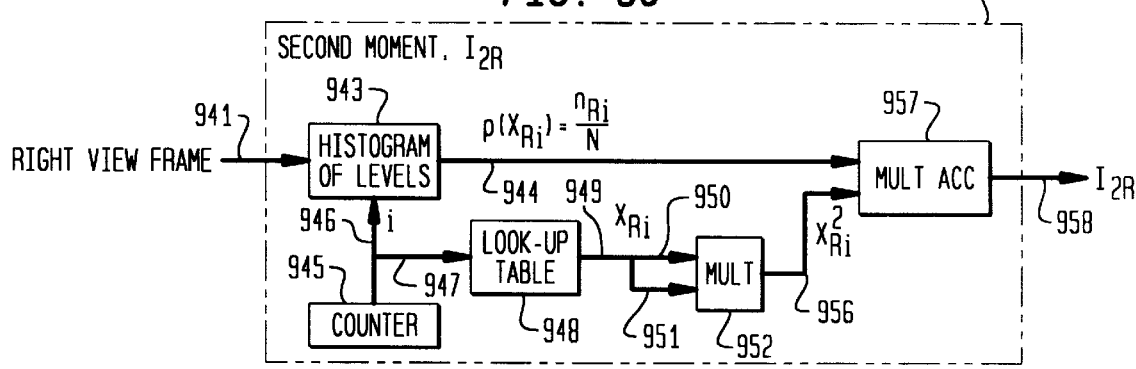
FIG. 9C shows a detailed block diagram for calculating the Second Moment, $I_{2R}$, needed in estimation of global gain and offset, arranged in accordance with the invention.

Now, the operation of FIG. 9C is described in which the right-view is input on line 941 from which a histogram of levels is computed in device 943. A counter, 945, which takes in values from 0 to 255, outputs a level, one-at-a-time on line 946. Quite simultaneously, the level on line 946 is also applied on line 947 to a look-up table, 948, which in our case outputs on line 949, a value same as input value on line 947. Line 949 is applied to both inputs 950 and 951 of a multiplier MULT, 952, whose output on line 956, as well as the value on line 944 is applied to a multiplier accumulator MULT ACC, 957 which repeats the loop for all values of counter before outputting the result on line 958.

Figure 9D:
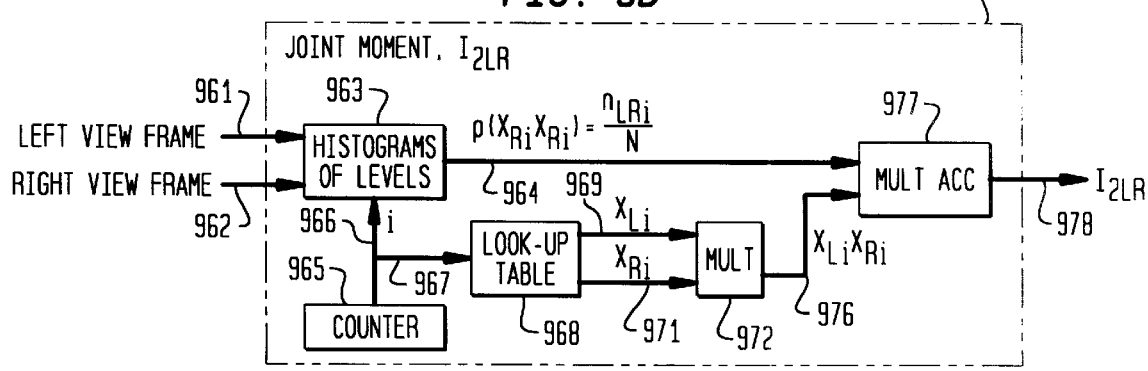
FIG. 9D shows a detailed block diagram for calculating the Joint Moment, $I_{2LR}$, needed in estimation of global gain and offset, arranged in accordance with the invention.

Next, the operation of FIG. 9D is now described in which the left-view is input on line 961 and the right-view is input on line 962 from which a combined histogram of levels is computed in 963. A counter, 965, which takes in values from 0 to 255, outputs a level, one-at-a-time on line 966. Quite simultaneously, the level on line 966 is also applied on line 967 to a look-up table, 968, which in our case outputs on lines 969 and 971, a value same as input value on line 967. Line 969 is applied as one input and line 971 as another input to multiplier MULT, 972, whose output on line 976, as well as the value on line 964 is applied to a multiplier accumulator MULT ACC, 977 which repeats the loop for all values of counter before outputting the result on line 978.

Figure 10:
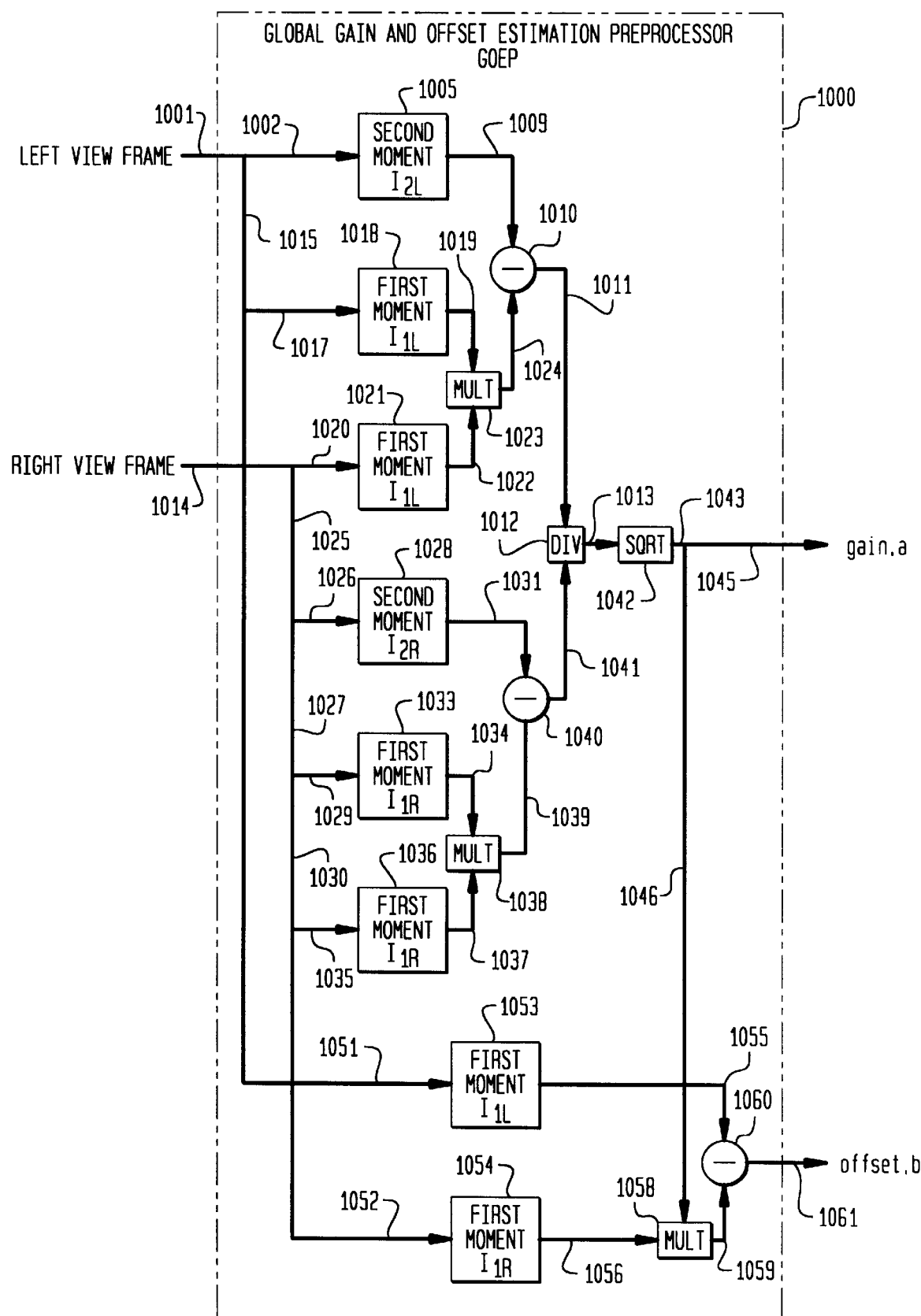
FIG. 10 shows a detailed block diagram of Global Gain and Offset Estimation Preprocessor based on the third method for computation of gain and offset, arranged in accordance with the invention.

FIG. 10 shows a simplified block diagram of yet another example of Gain and Offset Estimation Preprocessor (GOEP), 1000. This example is based on Method 3 for computing estimates of gain and offset. GOEP of 1000 is a straightforward implementation of gain and offset equations $$a = \sqrt{\frac{I_{2L} - (I_{1L})^2}{I_{2R} - (I_{1R})^2}}$$

and $b = I_{1L} - aI_{1R}$, respectively. There is considerable similarity in general operation of the Gain and Offset Estimation Preprocessor illustrated in FIG. 10 and that illustrated in FIG. 8. Left-view and right-views are input on lines 1001 and 1014. Line 1001 inputs left-view to second moment computer 1005 via line 1002, whose output is available on line 1009 and forms one input to a differencer 1110. Left-view and right-view are also input to respective first moments computers, 1018 and 1021, whose corresponding outputs, 1019 and 1021 form inputs to multiplier MULT, 1023. This multiplier outputs product on line 1024, which forms the other input to the aforementioned differencer, 1010, the difference is output on line 1011 and forms one input to divider DIV, 1012. Simultaneously, right-view is also applied to a second moment computer, 1028, and to two first moment computers, 1033 and 1036. The output of 1028 is available on line 1031 and forms one input to differencer 1040. The output of 1033 and 1036 on respective lines 1034 and 1037 is input to a multiplier 1038, whose output on line 1039 forms the second input to aforementioned differencer 1040, whose output on line 1041 forms the second input to the aforementioned divider DIV, 1012. The output of divider 1012 on line 1013 enters SQRT function in 1042. The output of SQRT is gain parameter, a, available on line 1045. Further, left and right-views are also input to first moment computers, 1053 and 1054. The output of 1053 on line 1055 forms one input to differencer 1060. The output of 1054 on line 1056 is multiplied in MULT, 1058 with gain parameter, a, available on line 1046. The output of MULT on line 1059 forms the second input to the aforementioned differencer, 1060, at whose output on line 1061 is the offset parameter, b.

FIG. 11A shows block diagram of stereoscopic codec structure that estimates gain and offset parameters and performs mismatch correction after coding at the decoder/display processor prior to display. Left-view is input on line 103 to Left View Encoder, 1101, which outputs coded left-view Bitstream on line 1122 and decoded left-view frames on line 1103. The right-view is input on line 104 to Right View Encoder with Disparity Compensation, 1115, at whose output 1116 is the coded right-view Bitstream. The two bitstreams are multiplexed in Sys Mux, 1124 and sent over channel, 1125 to Sys Demux, 1126, which demultiplexes and outputs individual bitstreams of left- and right-view on lines 1130 and 1135. Lines 1130 and 1135 respectively feed Left View Decoder, 1131 and Right View Decoder, 1140. The output of 1131 is decoded left-view frames and are input via line 1138 to Right View Decoder, 1140. The output of 1131 via line 1143 and the output of 1140 via line 1142 are applied to Global Gain and Offset Estimation Postprocessor, 1144, which outputs gain and offset values on line 1144 to Global Gain and Offset Postprocessor 1147, at the output of which, 1148, is the gain and offset corrected decoded right-view. The operation of 1147 is identical to the operation of GOCP, 223 and the operation of 1144 is exactly identical to operation of GOEP, 221. Any of the gain and offset correction methods described in 500, 800 and 1000 can be used in 1144. Likewise, gain and offset correction described with respect to the GOCP 700 of FIG. 7, can be used for Global Gain and Offset Postprocessor 1147.

FIG. 11B shows block diagram of stereoscopic codec structure that estimates gain and offset parameters at the preprocessor prior to coding but performs mismatch correction at the decoder/display processor prior to display. Left-view is input on line 103 to Left View Encoder, 1153, which outputs coded left-view bitstream on line 1152 and decoded left-view frames on line 1153. The right-view on line 104 is input via line 1170 to Global Gain and Offset Estimation Postprocessor, 1171, at the other input to which is left-view signal applied via line 1167. The output of 1171 is gain and offset parameters on line 1172 and are encoded by Right View Encoder, 1115. Also, the right-view on line 1155 is input to 1165, at the output of which, 1166, is the coded right-view Bitstream. The two bitstreams are multiplexed in Sys Mux, 1174 and sent over channel, 1175 to Sys Demux, 1176, which demultiplexes and outputs individual bitstreams of left- and right-view on lines 1180 and 1185. Lines 1180 and 1185 respectively feed Left View Decoder, 1181 and Right View Decoder, 1190. The output of 1181 is decoded left-view frames and are input via line 1188 to Right View Decoder, 1190. The output of 1190 via line 1191 is applied to Global Gain and Offset Correction Postprocessor, 1193, which also needs global gain and offset parameters on line 1192 decoded by 1190 from the Bitstream. The output of 1193 is the gain corrected decoded right-view. The operation of 1193 is identical to the operation of GOCP, 223 and the operation of 1171 is exactly identical to operation of GOEP, 221. Any of the gain and offset correction methods described in 500, 800 and 1000 can be used in 1171. Likewise, gain and offset correction described with respect to the GOCP 700 can be used for 1193.

It should be understood that the preferred embodiments and examples described are for illustrative purposes only and are not to be construed as limiting the scope of the present invention which is properly delineated only in the appended claims.

What is claimed is:

1. An apparatus for correcting global mismatch in gain between first and second views forming a stereoscopic image comprising:
   a) means for generating a first histogram of said first view and a second histogram of said second view, each said first and second histogram representing a frequency of occurrence of a characteristic component of said first and second views, respectively;
   b) means for comparing said first histogram of said first view with said second histogram of said second view and estimating mismatch in gain, a, between said first and second views; and,
   c) means for correcting the first and second views of said stereoscopic image by multiplying said mismatch in gain a and a second signal representing the second view and generating a gain corrected second signal of said stereoscopic image such that said gain corrected second signal and a first signal representing the first view form a stereoscopic image of improved quality.

2. The apparatus according to claim 1, wherein said first view and said second view are digitized representations of left and right views of the stereoscopic image, respectively, said characteristic component of said first and second views being luminance amplitude levels of said left and right views.

3. The apparatus according to claim 1, wherein said first view and said second view are digitized representations of left and right views of tee stereoscopic image, respectively, said characteristic component of said first and second views being color component levels of said left and right views.

4. The apparatus according to claim 1, wherein said means for comparing said first histogram of said first view with said second histogram of said second view includes means for obtaining a first set of characteristic points, $x_{L1}$, $x_{L2}$, from said first histogram, and obtaining a second set of characteristic points, $x_{R1}$, $x_{R2}$, from said second view, said second set of points substantially corresponding to said first set of points, further including means for calculating the mismatch in gain, a, according to $$a = \frac{x_{L1} - x_{L2}}{x_{R1} - x_{R2}}.$$

5. The apparatus according to claim 4, wherein said first set of characteristic points, $x_{L1}$, $x_{L2}$, of said first histogram is a pair selected from the group consisting of: distinct endpoints of said first histogram, first and second maxima extrema points of said first histogram, a maxima extrema point and a local minima point of said first histogram, and first and second local minima points of said first histogram.

6. The apparatus according to claim 5, further including means for estimating and correcting global mismatch in offset, b, between said first and second views including means for calculating $b=x_{L2}-ax_{R2}$, and, means for adding said offset b to said gain corrected second signal and generating a gain and offset corrected second view of said stereoscopic image.

7. The apparatus according to claim 1, wherein said means for comparing said first histogram of said first view with said second histogram of said second view includes means for calculating a statistical first left moment, $I_{1L}$, of said first histogram, a statistical first right moment, $I_{1R}$, of said second histogram, a statistical second right moment, $I_{2R}$, of said second histogram, and a statistical joint moment, $I_{2LR}$ between said first and second histograms; said statistical first left moment, $I_{1L}$, being calculated as $$I_{1L} = \sum_i x_{Li} p(x_{Li}),$$

said statistical first right moment, $I_{1R}$, being calculated as $$I_{1R} = \sum_i x_{Ri} p(x_{Ri});$$

said statistical second right moment, $I_{2R}$, being calculated as $$I_{2R} = \sum_i x_{Ri}^2 p(x_{Ri});$$

and, said statistical joint moment, $I_{2LR}$ between said first and second histograms being calculated as $$I_{2LR} = \sum_i x_{Li} x_{Ri} p(x_{Li} x_{Ri})$$

where $p(x_i)$ represents the frequency of occurrence of the characteristic component at $x_i$.

8. The apparatus according to claim 7, wherein said means for estimating mismatch in gain, a, includes means for calculating $$a = \frac{I_{2LR} - I_{1L} I_{1R}}{I_{2R} - (I_{1R})^2}.$$

9. The apparatus according to claim 8, further including means for estimating and correcting global mismatch in offset, b, between said first and second views including means for calculating $b=I_{1L}-aI_{1R}$ and, means for adding said mismatch in offset b to said gain corrected second view and generating a gain and offset corrected second view of said stereoscopic image.

10. The apparatus according to claim 7, wherein said means for comparing said first histogram of said first view with said second histogram of said second view includes means for computing a statistical second left moment, $I_{2L}$, of said second histogram by calculating $$I_{2L} = \sum_i x_{Li}^2 p(x_{Li}),$$

wherein said means for estimating mismatch in gain, a, includes means for calculating $$a = \sqrt{\frac{I_{2L} - (I_{1L})^2}{I_{2R} - (I_{1R})^2}}.$$

11. The apparatus according to claim 10, further including means for estimating and correcting global mismatch in offset, b, between said first and second views including means for calculating $b=I_{1L}-aI_{1R}$ and, means for adding said mismatch in offset b to said gain corrected second view and generating a gain and offset corrected second view of said stereoscopic image.

12. An apparatus for increasing compression efficiency of a stereoscopic image encoder employed for compressively encoding first and second signals representing respective first and second views of a stereoscopic image, said apparatus comprising:

a) means for generating a first histogram of said first view and a second histogram of said second view, said first and second histograms representing a frequency of occurrence of a characteristic component of said first and second views, respectively;

b) means for comparing said first histogram of said first view with said second histogram of said second view and for estimating mismatch in gain, a, and mismatch in offset, b, between said first and second views; and, c) means for multiplying said mismatch in gain a to said second signal to obtain a gain corrected second signal for said stereoscopic image and means for adding said mismatch in offset b to said gain corrected second signal to obtain a gain and offset corrected second signal, whereby compression efficiency is increased when said gain and offset corrected second signal and said first signal are input to the stereoscopic image encoder.

13. The apparatus according to claim 12, wherein said first view and said second view are digitized representations of left and right views of the stereoscopic image, respectively, said characteristic component of said first and second views being luminance amplitude levels of said left and right views.

14. The apparatus according to claim 12, wherein said first view and said second view are digitized representations of left and right views of the stereoscopic image, respectively, said characteristic component of said first and second views being color component levels of said left and right views.

15. The apparatus according to claim 12, wherein said means for comparing said first histogram of said first view with said second histogram of said second view includes means for obtaining a first set of characteristic points, $x_{L1}$, $x_{R1}$, from said first histogram, and obtaining a second set of characteristic points, $x_{R1}$, $x_{R2}$, from said second histogram, said second set of points substantially corresponding to said first set of points, further including means for calculating the mismatch in gain, a, according to $$a = \frac{x_{L1} - x_{L2}}{x_{R1} - x_{R2}}.$$

16. The apparatus according to claim 15, wherein said first set of characteristic points, $x_{L1}, x_{L2}$, of said first histogram is a pair selected from the group consisting of: distinct endpoints of said first histogram, first and second maxima extrema points of said first histogram, a maxima extrema point and a local minima point of said first histogram, and first and second local minima points of said first histogram.

17. The apparatus according to claim 15, wherein said means for estimating said mismatch in offset, b, between said first and second views includes means for calculating $b = x_{L2} = ax_{R2}$.

18. The apparatus according to claim 12, wherein said means for comparing said first histogram of said first view with said second histogram of said second view includes means for calculating a statistical first left moment, $I_{1L}$, of said first histogram, a statistical first right moment, $I_{1R}$, of said second histogram, a statistical second right moment, $I_{2R}$, of said second histogram, and a statistical joint moment, $I_{2LR}$ between said first and second histograms; said statistical first left moment, $I_{1L}$, being calculated as $$I_{1L} = \sum_i x_{Li} p(x_{Li}),$$

said statistical first right moment, $I_{1R}$, being calculated as $$I_{1R} = \sum_i x_{Ri} p(x_{Ri});$$

said statistical second right moment, $I_{2R}$, being calculated as $$I_{2R} = \sum_i x_{Ri}^2 p(x_{Ri});$$

and, said statistical joint moment, $I_{2LR}$ between said first and second histograms being calculated as $$I_{2LR} = \sum_i x_{Li} x_{Ri} p(x_{Li} x_{Ri})$$

where $p(x_i)$ represents the frequency of occurrence of the characteristic component at $x_i$.

19. The apparatus according to claim 18, wherein said means for estimating the mismatch in gain, a, includes means for calculating $$a = \frac{I_{2LR} - I_{1L} I_{1R}}{I_{2R} - (I_{1R})^2},$$

20. The apparatus according to claim 19, wherein said means for estimating the mismatch in offset, b, between said first and second views odes means for calculating $b = I_{1L} - aI_{1R}$.

21. The apparatus according to claim 18, wherein said means for comparing said first histogram of said first view with said second histogram of said second view includes means for computing a statistical second left moment, $I_{2L}$, of said second histogram by calculating $$I_{2L} = \sum_i x_{Li}^2 p(x_{Li}),$$

said means for estimating mismatch in gain, a, includes means for calculating $$a = \sqrt{\frac{I_{2L} - (I_{1L})^2}{I_{2R} - (I_{1R})^2}}.$$

22. The apparatus according to claim 21, wherein said means for estimating mismatch in offset, b, between said first arid second views includes means for calculating $b = I_{1L} - aI_{1R}$.

23. The apparatus according to claim 12, wherein the encoder includes an MPEG-1 encoder for encoding said first signal and an MPEG-2 Temporal scalability encoder for encoding said gain and offset corrected second signal.

24. The apparatus according to claim 12, wherein the encoder includes a non-scalable MPEG-2 encoder for encoding said first signal and an MPEG-2 Temporal scalability encoder for encoding said gain and offset corrected second signal.

25. The apparatus according to claim 12, wherein the encoder includes an H.263 encoder for encoding said first signal and an MPEG-4 utilizing disparity/motion compensated encoder for encoding said gain and offset corrected second signal.

26. A method for estimating and correcting global mismatch in gain and offset between first and second signals representing first and second views of a stereoscopic image comprising the steps of:
   a) providing a first histogram of said first view and a second histogram of said second view, said first and second histograms representing a frequency of occurrence of a characteristic component of said first and second views, respectively;
   b) comparing said first histogram of said first view with said second histogram of said second view and estimating mismatch in gain, a, and mismatch in offset, b, between said first and second views;
   c) correcting the first and second views of said stereoscopic image by multiplying said mismatch in gain a and said second signal to obtain a gain corrected second signal for said stereoscopic image and adding said mismatch in offset b to said gain corrected second signal to obtain a gain and offset corrected second signal such that when said gain and offset corrected second signal and said first signal are combined, a stereoscopic image of improved quality is formed.

27. The method according to claim 26, wherein said first view and said second view are digitized representations of left and right views of the stereoscopic image, respectively, said characteristic component of said first and second views being luminance amplitude levels of said left and right views.

28. The method according to claim 26, wherein said first view and said second view are digitized representations of left and right views of the stereoscopic image, respectively, said characteristic component of said first and second views being color component levels of said left and right views.

29. The method according to claim 26, wherein said step (b) of comparing said first histogram of said first view with said second histogram of said second view includes finding a first set of identifiable characteristic points, $x_{L1}$, $x_{L2}$, from said first histogram, and finding a second set of characteristic points, $x_{R1}$, $x_{R2}$, from said second histogram, said second set of points substantially corresponding to said first set of points, and wherein estimating mismatch in gain, a, includes calculating $$a = \frac{x_{L1} - x_{L2}}{x_{R1} - x_{R2}}.$$

30. The method according to claim 29, wherein said first set $x_{L1}$, $x_{L2}$, of characteristic identifiable points from said first histogram a pair selected from the group consisting of: distinct endpoints of said first histogram, first and second maxima extrema points of said first histogram, a maxima extrema point and a local minima point of said first histogram, and first and second local minima points of said first histogram.

31. The method according to claim 29, wherein said step of estimating mismatch in offset, b, between said first and second includes calculating $b = x_{L2} - a x_{R2}$.

32. The method according to claim 26, wherein said step (b) of comparing said first histogram of said first view with said second histogram of said second view includes the step of: applying a technique of linear minimization of mean square error estimates between first and second views by computing a statistical first left moment, $I_{1L}$, of said first histogram, a statistical first right moment, $I_{1R}$, of said second histogram, a statistical second right moment, $I_{2R}$, of said second histogram, and a statistical joint moment, $I_{2LR}$ between said first and second histograms; said statistical first left moment, $I_{1L}$, being calculated as $$I_{1L} = \sum_i x_{Li} p(x_{Li}),$$

said statistical first right moment, $I_{1R}$, being calculated as $$I_{1R} = \sum_i x_{Ri} p(x_{Ri});$$

said statistical second right moment, $I_{2R}$, being calculated as $$I_{2R} = \sum_i x_{Ri}^2 p(x_{Ri});$$

and, said statistical joint moment, $I_{2LR}$ between said first and second histograms being calculated as $$I_{2LR} = \sum_i x_{Li} x_{Ri} p(x_{Li} x_{Ri})$$

where $p(x_i)$ represents the frequency of occurrence of the characteristic component at $x_i$.

33. The method according to claim 32, wherein said mismatch in gain, a, is estimated by calculating $$a = \frac{I_{2LR} - I_{1L} I_{1R}}{I_{2R} - (I_{1R})^2}.$$

34. The method according to claim 33, wherein said step of estimating mismatch in offset, b, includes calculating $b = I_{1L} - a I_{1R}$.

35. The method according to claim 32, wherein said step (b) of comparing said first histogram of said first view with said second histogram of said second view includes the step of: comparing geometric shapes of said first and second histograms by further computing a statistical second left moment, $I_{2L}$, of said second histogram by calculating $$I_{2L} = \sum_i x_{Li}^2 p(x_{Li}),$$

and estimating said mismatch in gain, a, by calculating $$a = \sqrt{\frac{I_{2L} - (I_{1L})^2}{I_{2R} - (I_{1R})^2}}.$$

36. The method according to claim 35, wherein said step of estimating mismatch in offset, b, includes calculating $b = I_{1L} - a I_{1R}$.

37. The method according to claim 26, further including the steps of compressively encoding said first and gain and offset corrected second signals for transmission or storage in a compressed state, and decoding said compressed fist and compressed gain and offset corrected second signals to form the stereoscopic image, wherein said method steps a), b) and c) are performed prior to encoding to improve coding efficiency.

38. The method according to claim 26, further including the steps of compressively encoding a first and second original signals for transmission or storage in a compressed state, and decoding said compressed first and second original signals to form said first and second signals, wherein said method steps a), b) and c) are performed after decoding of said first and second original signals to provide a stereoscopic image of improved quality.

39. A method for increasing compression efficiency of a stereoscopic image encoder employed for compressively encoding first and second signals representing respective first and second views of a stereoscopic image comprising the steps of:

a) providing a first histogram of said first view and a second histogram of said second view, said first and second histograms representing a frequency of occurrence of a characteristic component of said first and second views, respectively;

b) comparing said first histogram of said first view with said second histogram of said second view and estimating mismatch in gain, a, and mismatch in offset, b, between said first and second views;

c) correcting said stereoscopic image by multiplying said gain a to said second signal to obtain a gain corrected second signal for said stereoscopic image and adding said offset b to said gain corrected second signal to obtain a gain and offset corrected second signal, wherein said gain and offset corrected second signal is obtained prior to encoding to increase encoding efficiency.

40. The method according to claim 39, wherein said first view and said second view are digitized representations of left and right views of the stereoscopic image, respectively, said characteristic component of said first and second views being luminance amplitude levels of said left and right views.

41. The method according to claim 39, wherein said first view and said second view are digitized representations of left and right views of the stereoscopic image, respectively, said characteristic component of said first and second views being color component levels of said left and right views.

42. The method according to claim 39, wherein said step (b) of comparing said first histogram of said first view with said second histogram of said second view includes finding a first set of characteristic points, $x_{L1}$, $x_{L2}$, from said first histogram, and finding a second set of characteristic points, $x_{R1}$, $x_{R2}$, from said second history said second set of points substantially corresponding to said first set of points, and wherein estimating the mismatch in gain, a, includes calculating $$a = \frac{x_{L1} - x_{L2}}{x_{R1} - x_{R2}}.$$

43. The method according to claim 42, wherein said first set $x_{L1}$, $x_{L2}$, of identifiable points in said first histogram is a pair selected from the group consisting of: distinct endpoints of said first histogram, first and second maxima extrema points of said first histogram, a maxima extrema point and a local minima point of said first histogram, and first and second local minima points of said first histogram.

44. The method according to claim 42, further including the step of determining global mismatch in offset, b, between said first and second view includes calculating $b = x_{L2} - ax_{R2}$ and, adding said offset b to said gain corrected second signal to obtain a gain and offset corrected second signal such that when said gain and offset corrected second signal and said first signal are combined, a stereoscopic image of improved quality is formed.

45. The method according to claim 39, wherein said step (b) of comparing said first histogram of said first view with said second histogram of said second view includes the step of: applying a technique of linear minimization of mean square error estimates between said first and second views by computing a statistical first left moment, $I_{1L}$, of said first histogram, a statistical first right moment, $I_{1R}$, of said second histogram, a statistical second right moment, $I_{2R}$, of said second histogram, and a statistical joint moment, $I_{2LR}$ between said first and second histograms; said statistical first left moment, $I_{1L}$, being calculated as $$I_{1L} = \sum_i x_{Li} p(x_{Li}),$$

said statistical first right moment, $I_{1R}$, being calculated as $$I_{1R} = \sum_i x_{Ri} p(x_{Ri});$$

said statistical second right moment, $I_{2R}$, being calculated as $$I_{2R} = \sum_i x_{Ri}^2 p(x_{Ri});$$

and, said statistical joint moment, $I_{2LR}$ between said first and second histograms being calculated as $$I_{2LR} = \sum_i x_{Li} x_{Ri} p(x_{Li} x_{Ri})$$

where $p(x_i)$ represents the frequency of occurrence of the characteristic component at $x_i$.

46. The method according to claim 45, wherein said mismatch in gain, a, is estimated by calculating $$a = \frac{I_{2LR} - I_{1L} I_{1R}}{I_{2R} - (I_{1R})^2}.$$

47. The method according to claim 46, wherein said step of estimating mismatch in offset, b, between said first and second views includes calculating $b = I_{1L} - aI_{1R}$.

48. The method according to claim 45 wherein said step (b) of comparing said first histogram of said first view with said second histogram of said second view includes the step of: comparing geometric shapes of said first and second histograms by further computing a statistical second left moment, $I_{2L}$, of said second histogram by calculating $$I_{2L} = \sum_i x_{Li}^2 p(x_{Li}),$$

and estimating said mismatch in gain, a, by calculating a $$a = \sqrt{\frac{I_{2L} - (I_{1L})^2}{I_{2R} - (I_{1R})^2}}.$$

49. The method according to claim 48, wherein said step of estimating mismatch in offset, b, between said first and second views includes calculating $b = I_{1L} - aI_{1R}$.

50. An apparatus for correcting mismatch in gain and offset between multiple views of a multi-view and a reference view of the multi-view, the multiple views represented by multiple signals, one view per signal, the reference view represented by a reference signal, the apparatus comprising:

a) means for generating a reference histogram of the reference signal and for generating multiple histograms from the multiple signals, each histogram representing a characteristic component of corresponding signal;

b) means for comparing each of said multiple histograms with the reference histogram and for estimating mismatches in gain and offset between each of said multiple histograms and the reference histogram;

c) means for gain correcting each of said multiple signals by multiplying each of said multiple signals and corresponding estimated mismatch in gain to obtain multiple gain corrected signals;

d) means for offset correcting each of said multiple gain corrected signals by adding to each of said multiple gain corrected signals corresponding estimated mismatch in offset, thereby obtaining multiple offset and gain corrected signals that can be combined with the reference signal to produce a multi-view video of improved quality.

* * * * *